US00RE34518E

United States Patent [19]

Covert et al.

[11] E Patent Number: Re. 34,518

[45] Reissued Date of Patent: Jan. 25, 1994

[54] VACUUM ACTUATED TANK VAPOR VENT VALVE

[75] Inventors: Charles H. Covert, Manchester; Kenneth W. Turner, Webster; Carl H. Sherwood, Brockport; William E. Gifford, Hemlock; Richard W. Wagner, Albion, all of N.Y.

[73] Assignee: General Motors Corporation, Detroit, Mich.

[21] Appl. No.: 905,589

[22] Filed: Jun. 26, 1992

Related U.S. Patent Documents

Reissue of:

[64] Patent No.: 5,014,742
Issued: May 14, 1991
Appl. No.: 504,818
Filed: Apr. 5, 1990

[51] Int. Cl.[5] ..... F16K 24/00

[52] U.S. Cl. ..... 137/588; 141/46; 141/59; 141/302

[58] Field of Search ..... 137/588; 141/46, 59, 141/302; 123/514, 516, 519, 520; 220/85 VR

[56] References Cited

U.S. PATENT DOCUMENTS

| | | | |
|---|---|---|---|
| 3,703,165 | 11/1972 | Hansen | 137/202 |
| 4,175,526 | 11/1979 | Phelan | 123/136 |
| 4,659,346 | 4/1987 | Uranishi et al. | 123/519 |
| 4,706,708 | 11/1987 | Fornuto et al. | 141/52 |
| 4,724,861 | 2/1988 | Covert et al. | 137/202 |
| 4,741,317 | 5/1988 | Yost | 123/520 |
| 4,747,508 | 5/1988 | Sherwood | 141/59 |
| 4,756,328 | 7/1988 | Sherwood | 137/43 |
| 4,762,156 | 8/1988 | Rich | 141/46 |
| 4,790,349 | 12/1988 | Harris | 137/587 |
| 4,796,593 | 1/1989 | Woodcock et al. | 123/518 |
| 4,798,306 | 1/1989 | Giacomazzi et al. | 137/588 |
| 4,809,863 | 3/1989 | Woodcock et al. | 220/85 VS |
| 4,819,607 | 4/1989 | Aubel | 123/519 |
| 4,821,908 | 4/1989 | Yost | 141/59 |
| 4,877,146 | 10/1989 | Harris | 141/286 |
| 4,881,578 | 11/1989 | Rich et al. | 137/588 |
| 5,054,520 | 10/1991 | Sherwood et al. | 137/587 |

*Primary Examiner*—A. Michael Chambers
*Attorney, Agent, or Firm*—Charles K. Veenstra

[57] ABSTRACT

A tank vapor vent valve assembly mounted to the top of the tank wall has a piston actuated by a source of engine vacuum which maintains a fill vapor exit closed until the gas cap is removed to relieve the vacuum and allow the piston to open.

4 Claims, 3 Drawing Sheets

VACUUM ACTUATED TANK VAPOR VENT VALVE

Matter enclosed in heavy brackets [ ] appears in the original patent but forms no part of this reissue specification; matter printed in italics indicates the additions made by reissue.

This invention relates to tank vapor vent valves in general, and specifically to such a valve that is actuated by the application and removal of engine vacuum.

BACKGROUND OF THE INVENTION

Vehicle fuel tanks normally and continually produce fuel vapors, often called the diurnal vapors or diurnal loss, which collect in a vapor dome at the top of the tank. If unrelieved, they could potentially over pressurize the tank. Diurnal vapors are routinely vented to a storage canister from which they are later purged by engine manifold vacuum and burned. The opening from the tank vapor dome to the canister is typically highly restricted, so as not to encourage vapor formation.

A much higher volume of vapor is displaced from the fuel tank when it is filled, known as the fuel fill vapors or fill loss. The fill loss must be allowed to exit the tank somehow, or the tank pressure would quickly rise so high that liquid fuel would back up the fuel tank filler pipe and shut off the fuel nozzle. Historically, fill losses have simply been vented to atmosphere. Many new fuel systems propose to recover the fill losses, as well, through some kind of tank vapor vent valve that routes the displaced vapor to the same canister. The exit for such a tank vapor vent valve must be considerably larger than the restricted opening in the diurnal loss line, since a high volume of vapor is expelled in a very short time. The larger exit of the tank vapor vent valve should not be exposed to the vapor dome except during fill, so as not to encourage diurnal vapor formation.

This consideration has led to many different proposed valve designs in which the valve is opened by an event that occurs only during fuel fill, such as the removal of the gas cap, or the insertion of the fuel nozzle. Otherwise, the valve is closed. Most of these designs also locate all the valve hardware near the end of the filler neck, so as to be close to the gas cap or filler nozzle. Other designs have proposed to locate the valve hardware remote from the filler neck, but still activated by the gas cap removal or nozzle insertion. These typically use a wire or other moving part stretching from the end of the filler neck to the remote valve.

SUMMARY OF THE INVENTION

The invention provides a tank vapor vent valve that is remotely actuated by the selective application and release of a source of engine vacuum, instead of through a wire or other mechanical means that runs from the filler neck.

A molded plastic valve housing is fixed to the top wall of the fuel tank, extending partially into the tank vapor dome. As disclosed, the valve housing has a single outlet tube, which mounts a line that runs to the vapor canister. The valve housing has two vapor inlets from the tank, a smaller inlet and a larger inlet, located side by side. The smaller inlet is sufficient to allow the normal volume of diurnal vapors to exit the tank, and is always open. The larger inlet has a diameter sufficient to allow the fuel fill vapors to exit, but is open only during fuel fill.

The larger inlet is selectively opened or closed by a vacuum actuated piston. The piston moves up or down within a vacuum chamber built into the valve housing. In a closed position, the piston blocks the larger diameter inlet, which serves as a valve seat, but the piston is spring biased toward the open position. The vacuum chamber is sealed except for a vacuum supply line and a vacuum relief line. The vacuum supply line runs from the vacuum chamber to the manifold, specifically to a vacuum reservoir that is evacuated by the manifold. The vacuum supply line is deliberately restricted, so that it cannot evacuate the vacuum chamber quickly, but it is more than sufficient to maintain the piston closed against the force of the spring if no other opening exists to relieve it.

The vacuum relief line runs from the vacuum chamber to the filler neck. A swinging plug in the filler neck is normally held closed by the gas cap to block off the vacuum relief line. However, when the gas cap is removed, the plug swings open. Because the vacuum supply line is restricted and the vacuum relief line is not, the vacuum chamber can refill through the open vacuum relief line more quickly than it can be emptied. Consequently, the piston springs open, unblocking the larger inlet and allowing the large volume of fuel fill vapors to quickly exit the tank as it is filled. When fill is finished, the gas cap is replaced, the vacuum relief line is replugged, and the vacuum chamber empties again to pull the piston closed.

It is, therefore, a general object of the invention to provide a remotely located tank vapor vent valve that is operated by the selective application and release of engine vacuum, rather than through direct mechanical means running from the filler neck.

It is another object of the invention to apply engine vacuum to a tank mounted valve to maintain a large size vapor exit normally closed, and to relieve the vacuum by removing the fuel tank filler neck closure cap, thereby opening the large size exit path for fuel vapors only during fill.

It is another object of the invention to provide a single tank mounted valve housing with two different sized inlets, so as to handle both ordinary tank venting and fuel fill venting.

DESCRIPTION OF THE PREFERRED EMBODIMENT

These and other objects and features of the invention will appear from the following written description, and from the drawings, in which.

Figure 1:
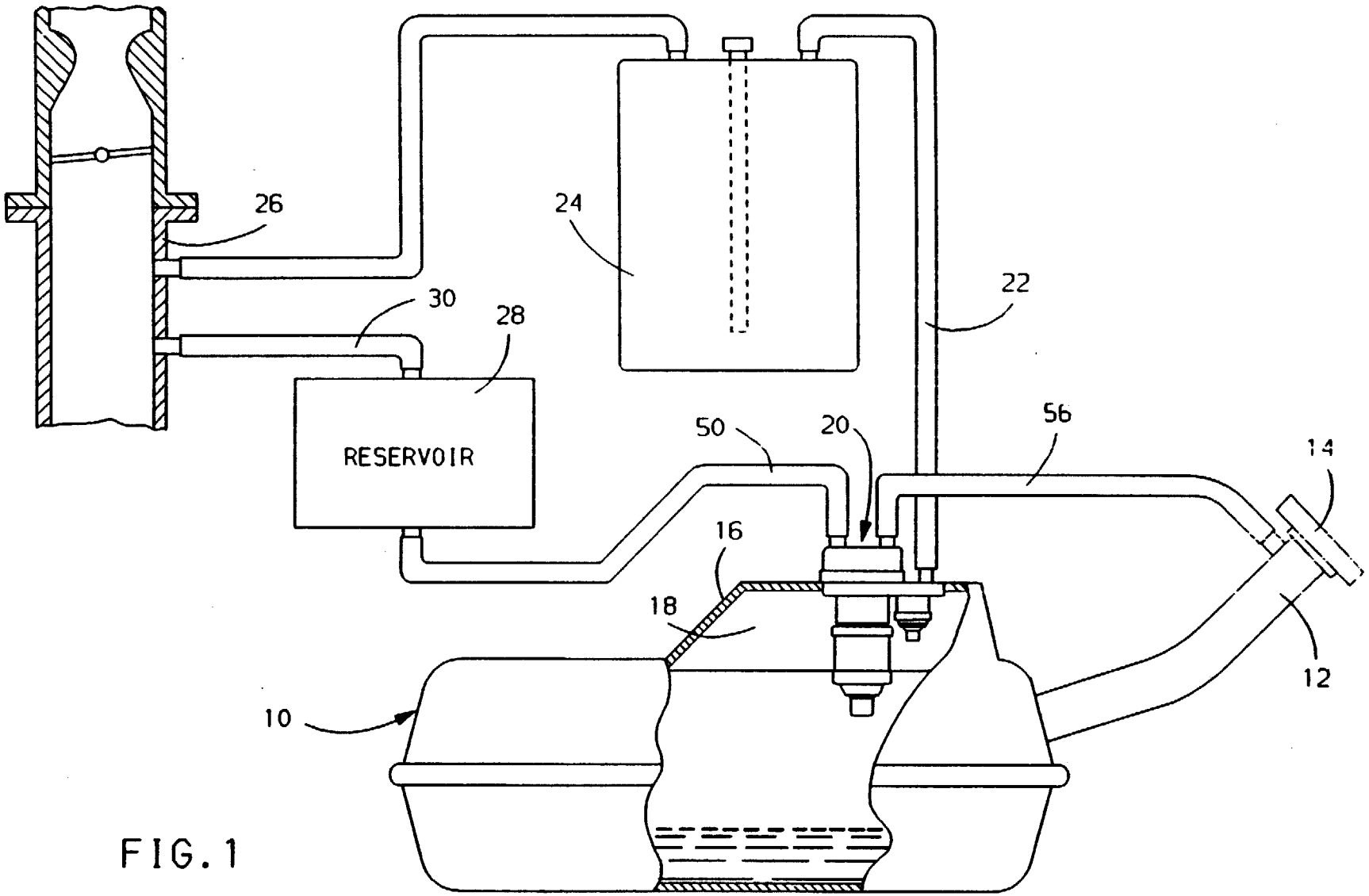
FIG. 1 is a diagrammatic depiction of a vehicle fuel tank and vapor emissions control system incorporating the invention.

Referring first to FIG. 1, a vehicle includes a fuel tank, indicated generally at 10, with a filler neck 12 closed by a removable gas cap 14. The bulged fuel tank top wall 16 creates a vapor collection space or dome 18 in which any fuel vapors will collect. The tank vapor vent valve assembly of the invention includes a valve housing, indicated generally at 20, fixed to tank top wall 16 above vapor dome 18. A canister line 22 runs from housing 20 to a vapor storage canister 24. Fuel vapors exit vapor dome 18 through housing 20 under circumstances described more fully below. The vehicle also has a manifold 26, which serves as a source of vacuum for two different purposes. First, it purges stored vapors from canister 24 in conventional fashion. Secondly, it serves as a source of engine vacuum. Specifically, when the engine is running, manifold 26 continually acts to evacuate a vacuum reservoir 28 through a vacuum feed line 30. Reservoir 28 would contain a conventional check valve, not illustrated, to prevent the loss of vacuum back through feed line 30 when the engine was not running. How reservoir 28 is used in the invention is described in full below.

Figure 2:
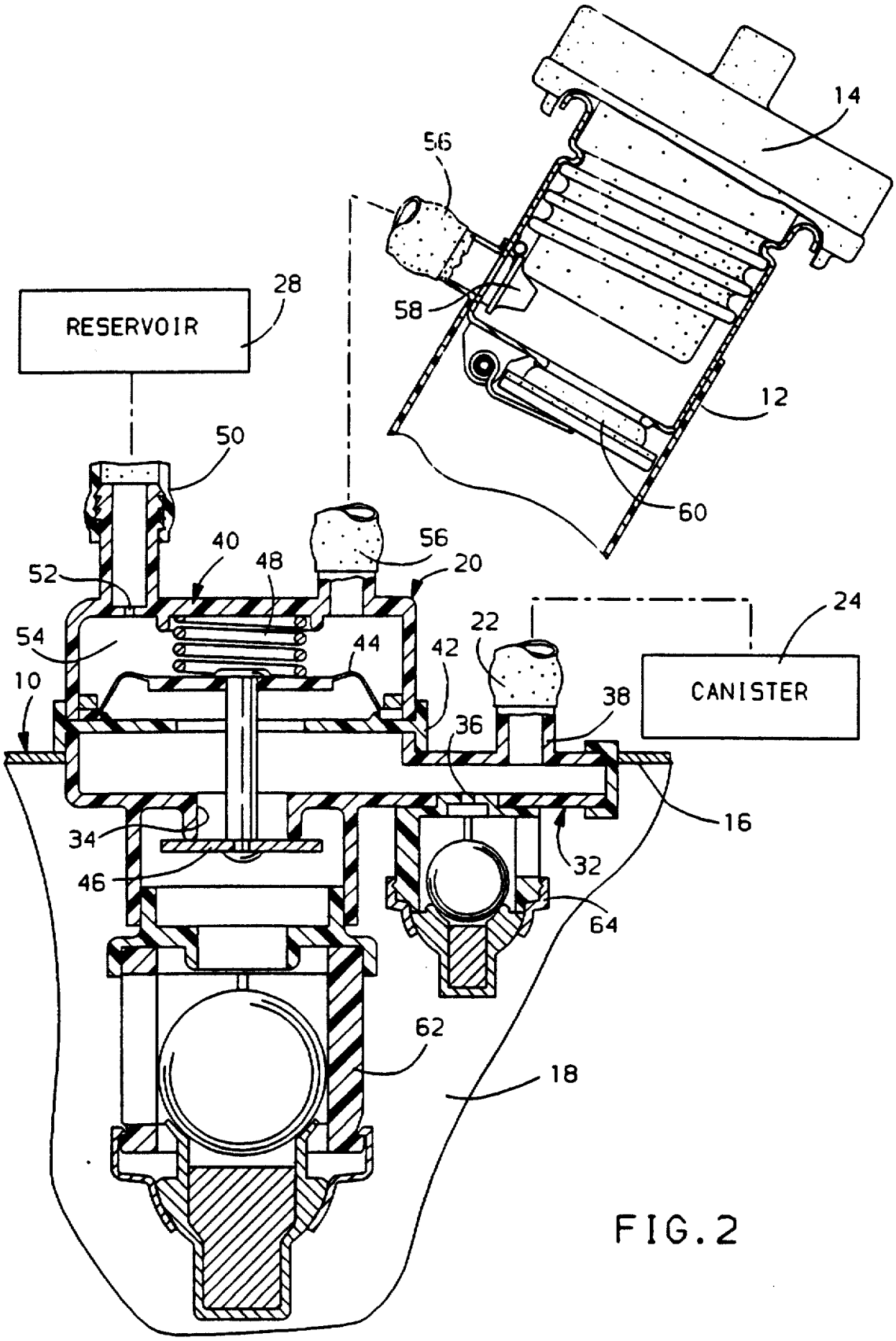
FIG. 2 is an enlarged cross sectional view of a preferred embodiment of the tank vapor vent valve of the invention when the fuel tank is closed.

Referring next to FIG. 2, valve housing 20 is molded of a suitable fuel resistant plastic in a number of separate pieces which are joined together to create several specific volumes. The larger piece is a shell 32, which is fixed to the tank top wall 16 so as to intrude partially into the tank vapor dome 18. Shell 32 provides two openings into vapor dome 18, a larger inlet 34 next to a significantly smaller inlet 36, which operate in parallel, as described below. Shell 32 provides only one outlet from vapor dome 18, a short tube 38 which is close to small inlet 36, but distant from the larger inlet 34. Tube 38 serves as the attachment for canister line 22. Smaller inlet 36 is always open, but is only large enough to allow the normal, diurnal fuel vapors to exit vapor dome 18 through canister line 22. Completing housing 20 is a cylindrical cap 40 that is fixed to shell 32, along with an annular rim 42, coaxial to larger inlet 34. Larger inlet 34 is large enough to allow tank 10 to vent as it is filled, but is not always open. Instead, inlet 34 serves as a seal seat that is selectively blocked and unblocked by additional structure described next.

Still referring to FIG. 2, a piston consists of a diaphragm 44 with a centrally mounted stem and washer assembly 46. Diaphragm 44 is biased by a compression coil spring 48 toward contact with rim 42, which defines an open position. However, as shown, diaphragm 44 is normally pulled up to a closed position, against the force of spring 48, so that the stem and washer assembly 46 blocks inlet 34. This is accomplished by vacuum from a vacuum supply line 50, which is continually supplied through cap 40 from reservoir 28 across a restricting orifice 52. Diaphragm 44 is air tight, so the space between it and cap 40 provides a vacuum chamber 54. Orifice 52 is so small that chamber 54 cannot be evacuated quickly, but diaphragm 44 will be pulled up eventually. A vacuum relief line 56 also opens through the top of cap 40, without restriction, and runs to and through the top of filler neck 12, just below gas cap 14. A plug 58 is pivoted to the inside of filler neck 12, just above a sealed splash door 60. When gas cap 14 is in place, which is always except during fuel fill, plug 58 is held solidly against the end of vacuum relief line 56. Therefore, vacuum chamber 54 remains evacuated, diaphragm 44 remains up, and larger inlet 34 remains blocked. Fuel vapors can leave vapor dome 18 only through the smaller inlet 36.

Figure 3:
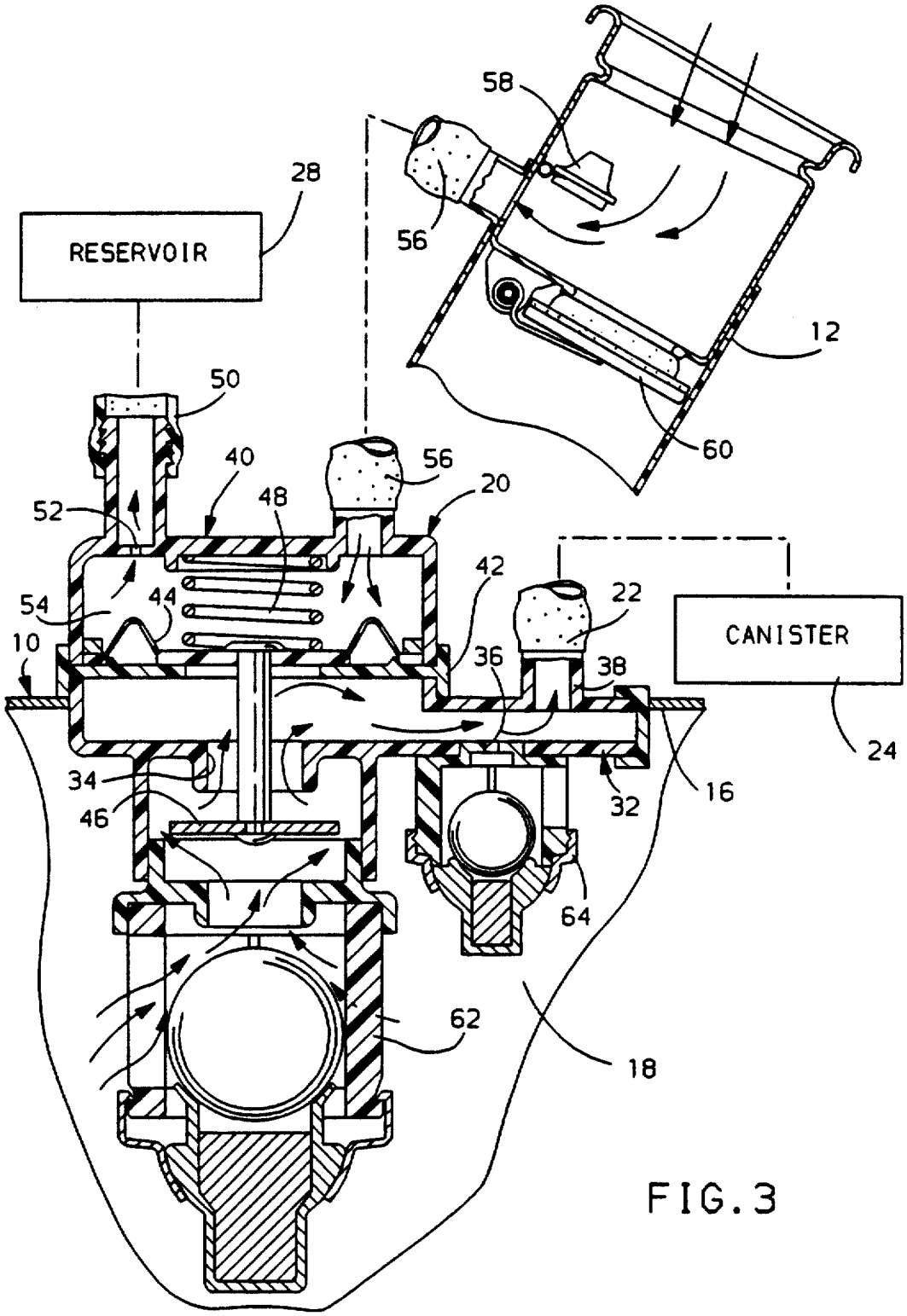
FIG. 3 is a view like FIG. 2, but after the fuel tank closure cap has been removed, during the fill operation.

Referring next to FIG. 3, when gas cap 14 is removed, plug 58, which is spring loaded, swings up and open. Fuel vapors cannot reach atmosphere because of sealed splash door 60. However, air from atmosphere can then rush into the end of vacuum relief line 56, and into vacuum chamber 54, as shown by the arrows. The negative pressure in vacuum chamber 54 will be relieved because air can enter through relief line 56 more quickly than it can be withdrawn by the restricted vacuum supply line 50. Therefore, spring 48 can push diaphragm 44 down, which moves stem and washer assembly 46 away from the larger inlet 34 to the open position. The fuel fill vapors can then quickly exit through inlet 34, through canister line 22, and finally to canister 24, also shown by arrows. At the end of the fuel fill operation, gas cap 14 is replaced, which pushes plug 58 back down to block vacuum relief line 56. Vacuum chamber 54 can again be emptied by vacuum reservoir 28, which pulls diaphragm 44 back up to in turn pull stem and washer assembly 46 back up and block inlet 34. In the particular embodiment disclosed, the portion of shell 32 that intrudes below tank top wall 16 is also used to mount a pair of so called roll over valve assemblies 62 and 64 below inlets 34 and 36 respectively. These protect the inlets 34 and 36 from the ingress of liquid fuel in the event of roll over, or excessive tilting, of the vehicle. The details of roll over valve assemblies like 62 and 64 are disclosed in co-assigned USPN 4,756,328.

Variations in the preferred embodiment could be made. A valve housing with a single opening the size of inlet 34 could be blocked and unblocked by a vacuum chamber actuated piston, so as to handle just the fuel fill vapors. It is an advantage, however, to have the larger and smaller inlets 34 and 36, in the same housing, and acting in parallel. Doing so provides for an efficient use of space and components. Other kinds of vacuum actuated pistons could be used. The spring loaded diaphragm 44 is easily incorporated into the housing 20 when the cap 40 is fitted to the shell 32, however, and its flexibility means that its closed position is not tolerance dependent. That is, with flexible diaphragm 44 located on one axial side of inlet 34, and with stem and washer assembly 46 extending through and to the other side of inlet 34, evacuation of chamber 54 will pull diaphragm 44 up until the stem and washer assembly 46 seats against inlet 34 regardless of variations in the axial separation of the components. Therefore, it will be understood that the invention is not intended to be limited to just the embodiment disclosed.

The embodiments of the invention in which an exclusive property or privilege is claimed are defined as follows:

1. In a vehicle having a source of engine vacuum, a fuel tank having a fuel vapor collection space and a fuel tank filler neck with a closure cap that is removed when said tank is filled, and a fuel vapor storage canister, a valve assembly for selectively admitting to said canister the fuel fill vapors displaced from said tank when it is filled, comprising:

a valve housing secured to said fuel tank and opening into said vapor collection space across a valve seat of a size sufficient to pass said fuel fill vapors, a canister line running between said valve housing and said canister, a vacuum chamber located proximate to said valve seat, a piston in said vacuum chamber movable between a closed position blocking said valve seat and an open position, said piston further having a resilient bias toward said open position, a vacuum supply line running between said engine vacuum source and said vacuum chamber of a size sufficient to slowly evacuate said vacuum chamber to pull said piston to said closed position, a vacuum relief line running between said vacuum chamber and said filler neck of a size sufficient to quickly refill said vacuum chamber, and, a plug in said filler neck movable from a closed position blocking said vacuum [exhaust] *relief* line when said closure cap is in place to an open position when said closure cap is removed, whereby, when said cap is in place, said vacuum chamber remains evacuated and said piston remains closed, and when said cap is removed to fill said tank, said vacuum chamber refills at a more rapid rate than said vacuum supply line can evacuate it, and said piston opens to allow fuel fill vapors to exit said tank to said canister through said valve seat.

2. In a vehicle having a source of engine vacuum, a fuel tank having a fuel vapor collection space that collects both the normal fuel vapors generated in said tank and the fuel fill vapors displaced when said tank is filled, said fuel tank also having a fuel tank filler neck with a closure cap that is removed when said tank is filled, and a fuel vapor storage canister, a valve assembly that continually admits said normal fuel vapors to said canister, but admits said fuel fill vapors only during fuel fill, said valve assembly comprising, a valve housing secured to said fuel tank over said vapor collection space, said valve housing having a single outlet and a pair of inlets opening into said vapor collection space, including a larger inlet of a size sufficient to pass said fuel fill vapors and a smaller inlet of a size sufficient to pass only said normal fuel vapors, a canister line running between said valve housing outlet and said canister, a vacuum chamber in said housing located over said larger inlet, a piston in said vacuum chamber movable between a closed position blocking said larger inlet and an open position, said piston further having a resilient bias toward said open position, a vacuum supply line running between said engine vacuum source and said vacuum chamber of a size sufficient to slowly evacuate said vacuum chamber to pull said piston to said closed position, a vacuum relief line running between said vacuum chamber and said filler neck of a size sufficient to quickly refill said vacuum chamber, and, a plug in said filler neck movable from a closed position blocking said vacuum [exhaust] *relief* line when said closure cap is in place to an open position when said closure cap is removed, whereby, when said cap is in place, said vacuum chamber remains evacuated and said piston remains closed so that fuel vapors may pass only through said smaller inlet, and when said cap is removed to fill said tank, said vacuum chamber refills at a more rapid rate than said vacuum supply line can re-evacuate it, and said piston opens to allow fuel fill vapors to exit said tank to said canister through said larger inlet as well.

3. In a vehicle having a source of engine vacuum, a fuel tank having a fuel vapor collection space and a fuel tank filler neck with a closure cap that is removed, when said tank is filled, and a fuel vapor storage canister, a valve assembly for selectively admitting to said canister the fuel fill vapors displaced from said tank when it is filled, comprising, a valve housing secured to said fuel tank and opening into said vapor collection space across a valve seat of a size sufficient to pass said fuel fill vapors, a canister line running between said valve housing and said canister, a vacuum chamber located proximate to said valve seat, a piston in said vacuum chamber movable between a closed position blocking said valve seat and an open position, said piston further having a resilient bias toward said open position, a vacuum supply line running between said engine vacuum source and into said vacuum chamber across a restricting orifice of a size sufficient to slowly evacuate said vacuum chamber to pull said piston to said closed position, a vacuum relief line running between said vacuum chamber and said filler neck of a size larger than said restricting orifice, and, a plug in said filler neck movable from a closed position blocking said vacuum [exhaust] *relief* line when said closure cap is in place to an open position when said closure cap is removed, and, a sealed splash door located in said filler neck below said plug, whereby, when said cap is in place, said vacuum chamber remains evacuated and said piston remains closed, and when said cap is removed to fill said tank, said sealed splash door maintains said filler neck sealed from atmosphere while said vacuum chamber refills at a more rapid rate than said vacuum supply line can evacuate it, and said piston opens to allow fuel fill vapors to exit said tank to said canister through said valve seat.

*4. In a vehicle having a source of engine vacuum, a fuel tank having a fuel vapor collection space that collects both the normal fuel vapors generated in said tank and the fuel fill vapors displaced when said tank is filled, said fuel tank also having a fuel tank filler neck with a closure cap that is removed when said tank is filled, and a fuel vapor storage canister, a valve assembly for selectively admitting to said canister the fuel fill vapors displaced from said tank when it is filled, comprising,*

*a valve housing having an outlet and a pair of inlets opening into said vapor collection space, including a larger inlet of a size sufficient to pass said fuel fill vapors and a smaller inlet of a size sufficient to pass only said normal fuel vapors,*

*a canister line running between said valve housing outlet and said canister,*

*a vacuum chamber in said housing located over said larger inlet,*

*a piston in said vacuum chamber movable between a closed position blocking said larger inlet and an open position, said piston further having a resilient bias toward said open position,*

*a vacuum supply line running between said engine vacuum source and said vacuum chamber to evacuate said vacuum chamber to pull said piston to said closed position,*

*whereby, said vacuum chamber remains evacuated and said piston remains closed to allow only said normal fuel vapors to exit said tank to said canister through said smaller inlet when engine vacuum is applied, and said piston opens to allow fuel fill vapors to exit said tank to said canister through said larger inlet when engine vacuum is absent.*

* * * * *